US006698090B1

(12) United States Patent
Hsu

(10) Patent No.: US 6,698,090 B1
(45) Date of Patent: Mar. 2, 2004

(54) STRUCTURE OF TERMINAL CONNECTOR PLIERS

(76) Inventor: Chan Ting Hsu, PO Box 82-144, Taipei (TW)

( * ) Notice: Subject to any disclaimer, the term of this patent is extended or adjusted under 35 U.S.C. 154(b) by 195 days.

(21) Appl. No.: 09/987,494

(22) Filed: Nov. 15, 2001

(51) Int. Cl.[7] ........................ B23P 19/00; H01R 43/042
(52) U.S. Cl. ............................. 29/751; 29/753; 29/757; 29/760; 72/409.19
(58) Field of Search .......................... 29/751, 753, 757, 29/758, 760, 761, 863, 268, 828, 861; 72/409.14, 409.16, 409.01, 416

(56) References Cited

U.S. PATENT DOCUMENTS 5,168,592 A * 12/1992 Jee ................................ 7/107
5,941,120 A * 8/1999 Jee .......................... 72/409.14
6,112,404 A * 9/2000 Tarpill ......................... 29/751

* cited by examiner

*Primary Examiner*—Carl J. Arbes
*Assistant Examiner*—Thiem Phan

(74) *Attorney, Agent, or Firm*—Leong C. Lei

(57) ABSTRACT

An improved structure of terminal connector pliers is disclosed. The pliers comprise a connection seat having a wire slot at the top end thereof; a first pliers body being mounted with a spring at the top end thereof, and elastically and pivotally connected to a first side of the connection seat; a second pliers body being mounted with a spring at the top end thereof, and elastically and pivotally connected to a second side of the connection seat; a sliding seat slidably connected to the connection seat and a top pressing region being defined at the top end, and the top pressing region being projected onto the wire slot; a first connection rod having a first end pivotally mounted onto a first pliers body and having a second end pivotally connected to the first side of the sliding seat; a second connection end having a first end pivotally mounted onto a second pliers body and having a second end pivotally connected to the second side of the sliding seat; thereby when the first and the second pliers bodies are combined, the first and the connection rod are urged to cause the sliding seat on the connection seat moves in linear direction so that a terminal connector located between the sliding seat and the connection seat is relatively pressed with respect to the top and bottom end so that a conductive wire is fastened to the terminal connection.

1 Claim, 4 Drawing Sheets

STRUCTURE OF TERMINAL CONNECTOR PLIERS

BACKGROUND OF THE INVENTION (a) Technical Field of the Invention

The present invention relates to pliers, and in particular, an improved structure of terminal connector pliers to connect by pressing the terminal connector positioned between a sliding seat and a connection seat so that a conductive wire is connected to the terminal connector.

(b) Description of the Prior Art

Co-axial cables have been widely used, as cable TV and Internet services have been a trend recently. Connecting device or tool for terminal connector for these co-axial cables comprises two handles having one end each being a holding region and the other end being a pressing region and the pressing of the holding region urging two pressing regions to close toward each other or apart from one another; a module having a mold seat and a replaceable mold and the mold seat being mounted to the pressing region and a cavity being formed in the mold, the diameter of the cavity being substantially the same as the external diameter of the mounting element, and the end portion of the cavity being provided with a protruded edge spaced apart axially with the cavity, and the diameter of the protruded edge being substantially the same as the external diameter of the cable; a push rod spaced apart from the module so as to support the connector and the end thereof and a base seat mounted to the pressing regions of the two handles and having a push rod to move in linear direction to the support seat or away from the support seat. In application when the two handles are closed to one another, the front end of the handle (i.e. the connector and one end of the cable) is not pressed against the connector in a linear direction but in an arch-shaped direction. Thus the path of the pressing process of the device is not parallel to the connector. Thus when the user applies the device, the pressing process is not smooth and the operation is rather laborious. This is the drawback of the conventional device for connection of co-axial cable to a terminal connector. Accordingly, it is an object of the present invention to provide and improved structure of terminal connector pliers, which can mitigate the above-mentioned drawbacks.

SUMMARY OF THE INVENTION

Accordingly, it is an object of the present invention to provide an improved structure of terminal connector pliers, wherein the pliers comprises a connection seat having a wire slot at the top end thereof; a first pliers body being mounted with a spring at the top end thereof, and elastically and pivotally connected to a first side of the connection seat; a second pliers body being mounted with a spring at the top end thereof, and elastically and pivotally connected to a second side of the connection seat; a sliding seat slidably connected to the connection seat and a top pressing region being defined at the top end, and the top pressing region being projected onto the wire slot; a first connection rod having a first end pivotally mounted onto a first pliers body and having a second end pivotally connected to the first side of the sliding seat; a second connection end having a first end pivotally mounted onto a second pliers body and having a second end pivotally connected to the second side of the sliding seat; thereby when the first and the second pliers bodies are combined, the first and the connection rod are urged to cause the sliding seat on the connection seat moves in linear direction so that a terminal connector located between the sliding seat and the connection seat is relatively pressed with respect to the top and bottom end so that a conductive wire is fastened to the terminal connection.

Another object of the present invention is to provide an improved structure of terminal connector pliers, wherein the wire slot is mounted with a position plate having a clipping space at the center thereof which forms a connection with the top side of the wire slot, and an internally extended spring plate is provided at the position plate and the extended end section of the spring plate is provided with an internally extended protruded edge such that the terminal connector of a co-axial cable from the wire slot is clipped and positioned at the spring plate of the position plate.

A further object of the present invention is to provide an improved structure of terminal connector pliers, wherein at least an engaging block is provided to the middle section of the first and the second pliers bodies extended outward from the connection seat, the engaging block is provided with a plurality of screw holes allowing screw mounting of all types of screws.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
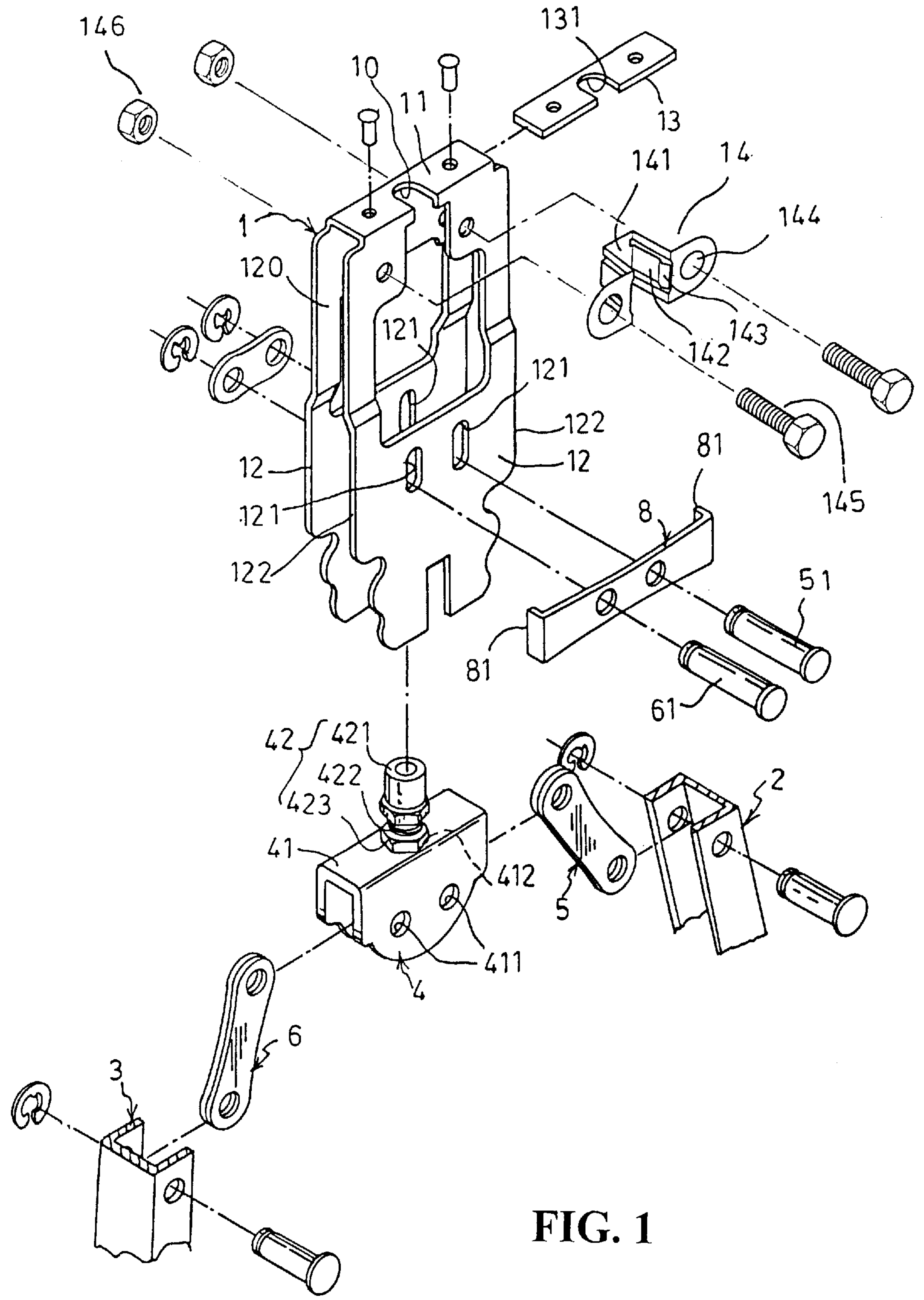
FIG. 1 is an exploded perspective view of an improved structure of terminal connector pliers of the present invention.
Figure 2:
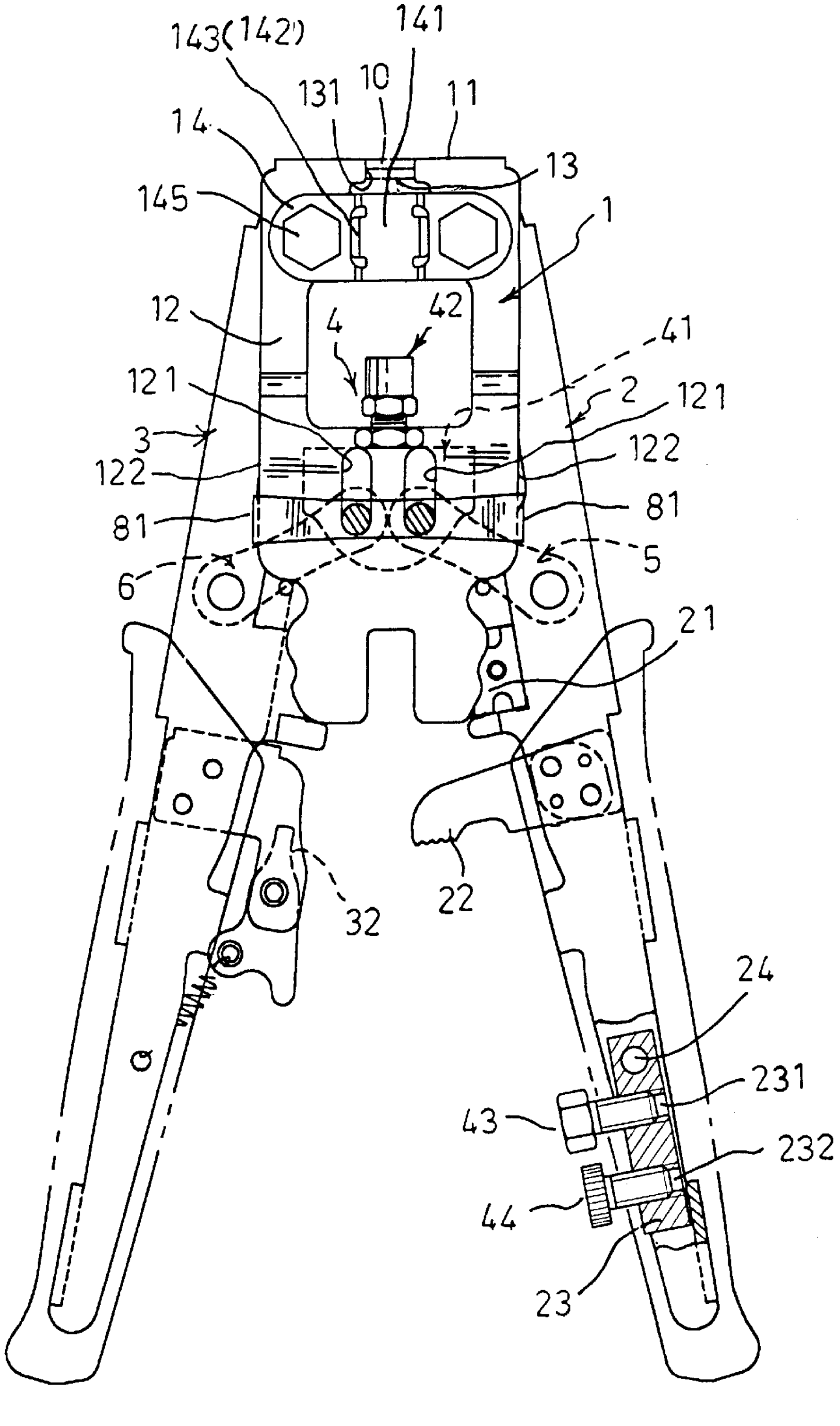
FIG. 2 is a schematic sectional view of an improved structure of terminal connector pliers of the present invention.

Referring to FIGS. 1 and 2, there is shown an improved structure of terminal connector pliers comprising a connection seat 1, a first pliers body 2, a second pliers body 3 and a sliding seat 4. The connection seat 1 contains a top plate portion 11 having two sides respectively downwardly connected to a sideboard 12. The other side of the top plate portion 11 is provided with a wire slot 10 for mounting with a position plate 14. The center of the position plate 14 is provided with a clipping space 141 which can be connected to the topside of the wire slot 10 to form a connection. The position plate 14 located at the two sides of the clipping space 141 has a spring 142 extended internally and the extended end portion of the individual spring plates 142 has a protruded edge 143 extended internally. The two sides of the position plate 14 are extended externally and the center of the extended section has a hole 144 for the mounting of a bolt 145 with nut 146 to the connection seat 1.

The connection seat 1 located between two side plates 12 is defined into a sliding space 120 to accommodate the sliding seat 4 for sliding motion. The two sides of the side plate 12 are provided with two parallel sliding slots 121 for the mounting of pivotal pegs 51, 61 of the first end of the first and the second connection rods 5,6 to be slidably therein. The top end of the first pliers body 2 is provided with a spring 20 elastically connected to the first side of the connection seat 1. The top end of the second pliers body 3 is provided with a spring 30 elastically and pivotally connected to the second side of the connection seat 1.

The sliding seat 4 is slidably mounted to the connection seat 1 including a body 41. There are two pivotal holes 411 on the body 41 for mounting with a pivotal peg 51,61 so as to respectively and pivotally connected to the first end of the first and the second connection rods 5, 6. The top face of the body 41 has a screw hole 412 and a top pressing head 42 having the top section being defined a head portion 421 to connect to the bottom section 76 of the terminal connector 7. The bottom section of the pressing head 42 is a screw rod section 422 to connect with a packing female screw 423 to screw to the screw hole 412 of the body 41.

Thereby, the female screw 423 fastens the top pressing head 42 to the top face of the body 41, and the top pressing head 42 (due to the screw rod section 422 being mounted to the body 41) can rotatably adjust the distance between the top end of the top pressing head 42 and the top plate section 11 of the connection seat. The first end of the first connection rod 5 is pivotally connected to the first pliers body 2 and the second end is pivotally connected to the first lateral side of the sliding seat 4. The first end of the second connection rod 6 is connected to the second pliers body 3, and the second end is pivotally connected to the second side of the sliding seat 4. Thus, when the first and the second pliers body 2, 3 are combined together, the first and the second connection rods 5, 6 are urged to linearly slide to the sliding seat 4.

The hollow section of the middle section of the first pliers body 2 (or the second pliers body 3) is provided with an engaging block 23 mounted with a peg 24. There are a plurality of screw holes 231, 232 on the engaging block 23 to fit and position components of various specification, (for instance, the top pressing head 43, 44), allowing portability.

Figure 3:
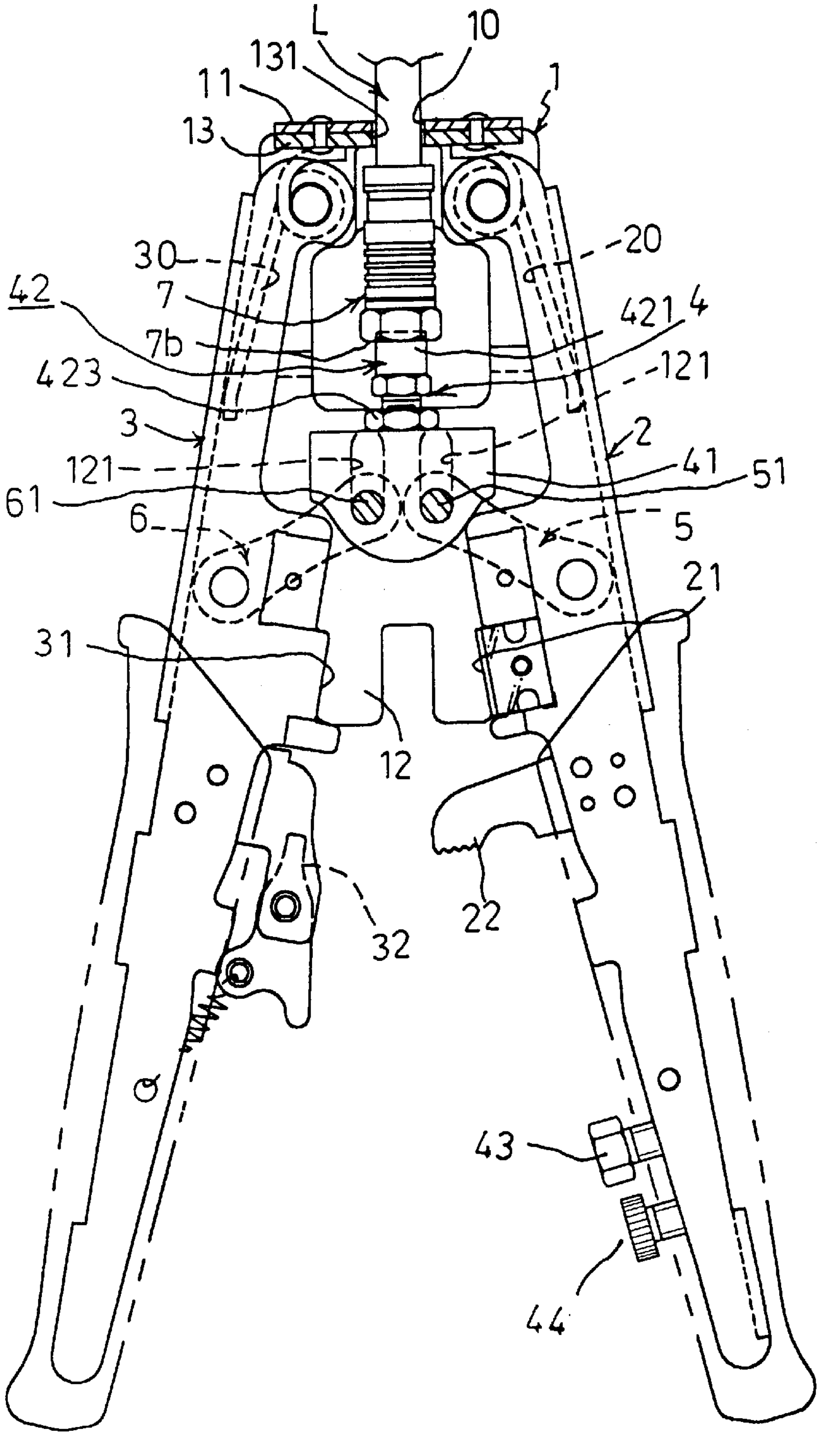
FIG. 3 is a sectional view of an improved structure of terminal connector pliers of the present invention, wherein the first and the second pliers bodies are extended.
Figure 4:
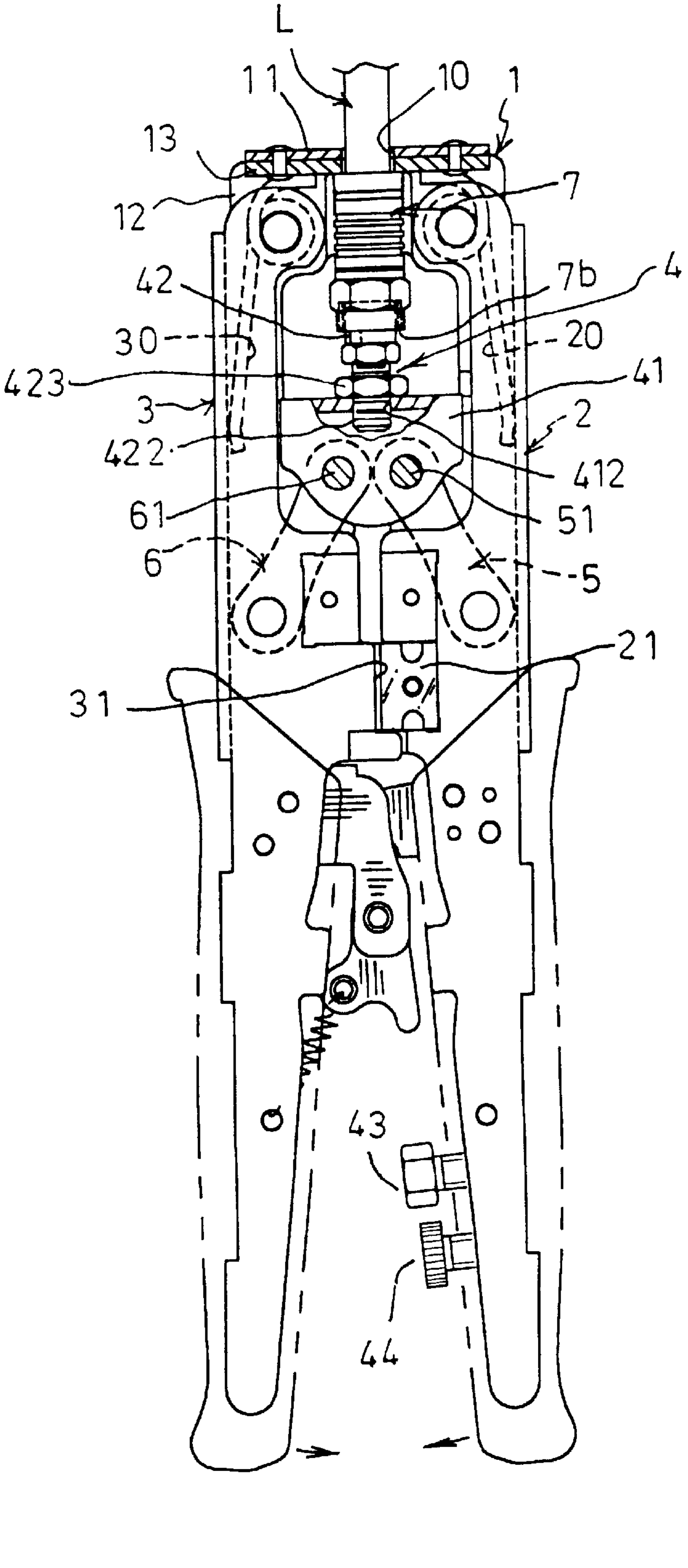
FIG. 4 is a sectional view of an improved structure of terminal connector pliers of the present invention, wherein the first and the second pliers bodies are retracted.

FIGS. 3 and 4 respectively show the opening and retracting of the pliers. As shown in FIG. 2, the bottom section of the top plate portion of the connection seat can be connected with a base plate 13 of a hard material, and one side of the base plate 13 is a slot 131, which corresponds to the wire slot 10 to accommodate a conductive wire L. Thus, the top end of the terminal connector 7 is avoided from direct pressing against the top plate portion 11 of the connection plate so as to improve the longevity of the pliers.

The inner edge of the second pliers body 3 is a platform 31, and a cutter 21 is mounted corresponding to the first pliers body 2 to allow the combination of the first and the second pliers body 2, 3 and the conductive wire L is cut by means of the platform 31 and the cutter 21. The first pliers body 2 can be mounted with a position ratchet board 22 and the inner side of the second plies body 3 is pivotally mounted with a ratchet finger 32 so that when the first and the second pliers body 2, 3 are combined, the ratchet finger 32 will block in one direction the ratchet teeth of the ratchet board 22.

The present pliers includes at least a position and holding plate 8, pegs 51, 56 pivotally connected to the first end of the first and second connection rod 5, 6 and the two lateral sides of the holding plate 8 respectively extended a blocking wall 81 to lean against one of the lateral side plate 12 of the two board edge 122 of the connection seat 1 such that when the first and second connection rods 5, 6 push the sliding seat 4, the sliding seat 4 can be stably moved so that the terminal connector 7 between the sliding seat 4 and the connection seat 1 are squeezed and the conductive wire L is tightly engaged to the terminal connector 7.

In application, the conductive wire L is placed to the connector 7, and the connector 7 is placed between onto the base plate 13 and the top pressing head 42, then the first and the second pliers body 2, 3 are combined. At this instance, the first and the second connection rods 5, 6 cause the sliding seat 4 to slide in linear direction to the top plate section 11, and the top and bottom section of the connector 7 engage the conductive wire L. In accordance with the present invention, the first and the second connection rods 5, 6 simultaneously move the sliding seat 4, therefore, the movement of the sliding seat 4 is smooth and stable, and the connection of conductive wire L with the connector 7 is smooth and convenient.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of connector pliers comprising:

a connection seat having a wire slot at the top end thereof;

a first pliers body being mounted with a spring at the top end thereof, and elastically and pivotally connected to a first side of the connection seat;

a second pliers body being mounted with a spring at the top end thereof, and elastically and pivotally connected to a second side of the connection seat;

a sliding seat slidably connected to the connection seat and a top-pressing region being defined at the top end, and the top-pressing region being projected onto the wire slot;

a first connection rod having a first end pivotally mounted onto a first pliers body and having a second end pivotally connected to the first side of the sliding seat;

a second connection rod having a first end pivotally mounted onto a second pliers body and having a second end pivotally connected to the second side of the sliding seat; thereby when the first and the second pliers body are combined, the first and the connection rod are urged to cause the sliding seat on the connection seat moves in linear direction so that a terminal connector located between the sliding seat and the connection seat is relatively pressed with respect to the top and bottom end so that a conductive wire is fastened to the terminal connection;

wherein a position and holding plate is pivotally connected to the pivotal peg of the first end of the first and second connection rod, and a blocking wall is protruded axially from the two sides of the position and the holding plate to lean against the two side plate edges of the side plate of the connection seat.

* * * * *